US008769019B2

(12) United States Patent
Chalmers et al.

(10) Patent No.: US 8,769,019 B2
(45) Date of Patent: Jul. 1, 2014

(54) METHODS AND SYSTEMS FOR MANAGING SHARED STATE WITHIN A DISTRIBUTED SYSTEM WITH VARYING CONSISTENCY AND CONSENSUS SEMANTICS

(75) Inventors: Robert Chalmers, Santa Barbara, CA (US); Todd Bryan, Goleta, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1446 days.

(21) Appl. No.: 11/381,704

(22) Filed: May 4, 2006

(65) Prior Publication Data
US 2007/0260689 A1 Nov. 8, 2007

(51) Int. Cl.
*G06F 15/16* (2006.01)
*G06T 11/20* (2006.01)
*G06F 17/00* (2006.01)
*G06F 3/00* (2006.01)

(52) U.S. Cl.
USPC ........... 709/205; 715/201; 715/730; 715/717; 345/419

(58) Field of Classification Search
USPC .......... 709/204–206; 345/418, 419, 440, 473; 715/200, 201, 700, 716, 717, 730, 733
See application file for complete search history.

(56) References Cited

U.S. PATENT DOCUMENTS

| 4,887,204 | A | 12/1989 | Johnson et al. |
|---|---|---|---|
| 4,928,247 | A | 5/1990 | Doyle et al. |
| 4,937,036 | A | 6/1990 | Beard et al. |
| 5,204,897 | A | 4/1993 | Wyman |
| 5,220,604 | A | 6/1993 | Gasser et al. |
| 5,262,968 | A * | 11/1993 | Coffield ................ 364/604 |
| 5,315,711 | A | 5/1994 | Barone et al. |
| 5,367,633 | A | 11/1994 | Matheny et al. |
| 5,432,932 | A | 7/1995 | Chen et al. |
| 5,440,719 | A | 8/1995 | Hanes et al. |
| 5,481,721 | A | 1/1996 | Serlet et al. |
| 5,530,795 | A * | 6/1996 | Wan ...................... 715/759 |
| 5,553,083 | A | 9/1996 | Miller |
| 5,619,638 | A | 4/1997 | Duggan et al. |
| 5,649,104 | A * | 7/1997 | Carleton et al. ........... 709/204 |
| 5,727,002 | A | 3/1998 | Miller |
| 5,764,235 | A | 6/1998 | Hunt et al. |

(Continued)

FOREIGN PATENT DOCUMENTS

EP 1286271 2/2003

OTHER PUBLICATIONS

"Online Meetings Made Easy" 2006 GoToMeeting Fact Sheet, [retrieved Feb. 18, 2008], Retrieved from the Internet: <https://www2.gotomeeting.com/default/downloads/pdf/p/GoToMeeting%5fFact%5fSheet.pdf>, 2 pages.

(Continued)

*Primary Examiner* — Larry Donaghue
(74) *Attorney, Agent, or Firm* — McDermott Will & Emery LLP

(57) ABSTRACT

Methods and systems for managing shared state within a distributed system with varying consistency and consensus semantics are described. In one configuration, a computing device receives a first plurality of objects representing the state of a first item and a second plurality of objects representing the state of a second item. The computing device generates a composed view of the state of each of the first item and the second item. The resulting composed views are transmitted using a reliable multicast protocol.

17 Claims, 13 Drawing Sheets

(56) References Cited

U.S. PATENT DOCUMENTS

| | | | |
|---|---|---|---|
| 5,809,235 A | | 9/1998 | Sharma et al. |
| 5,822,523 A | * | 10/1998 | Rothschild et al. ............ 709/236 |
| 5,826,025 A | | 10/1998 | Gramlich |
| 5,845,265 A | | 12/1998 | Woolston |
| 5,864,678 A | | 1/1999 | Riddle |
| 5,956,027 A | | 9/1999 | Krishnamurthy |
| 5,983,190 A | | 11/1999 | Trower, II et al. |
| 5,987,376 A | | 11/1999 | Olson et al. |
| 6,081,829 A | | 6/2000 | Sidana |
| 6,167,432 A | | 12/2000 | Jiang |
| 6,185,569 B1 | * | 2/2001 | East et al. ............................. 1/1 |
| 6,246,758 B1 | | 6/2001 | Low |
| 6,249,291 B1 | | 6/2001 | Popp et al. |
| 6,292,204 B1 | * | 9/2001 | Carleton et al. .............. 715/753 |
| 6,321,252 B1 | | 11/2001 | Bhola et al. |
| 6,343,313 B1 | | 1/2002 | Salesky et al. |
| 6,366,933 B1 | | 4/2002 | Ball et al. |
| 6,381,635 B1 | * | 4/2002 | Hoyer et al. .................. 709/207 |
| 6,496,201 B1 | * | 12/2002 | Baldwin et al. ............... 715/753 |
| 6,542,165 B1 | * | 4/2003 | Ohkado ......................... 715/751 |
| 6,567,813 B1 | | 5/2003 | Zhu et al. |
| 7,013,327 B1 | | 3/2006 | Hickman et al. |
| 7,096,200 B2 | * | 8/2006 | Wang et al. ...................... 705/50 |
| 7,181,690 B1 | * | 2/2007 | Leahy et al. .................. 715/706 |
| 7,197,535 B2 | | 3/2007 | Salesky et al. |
| 7,277,905 B2 | * | 10/2007 | Randal et al. ................. 707/648 |
| 7,310,675 B2 | | 12/2007 | Salesky et al. |
| 7,369,515 B2 | | 5/2008 | Salesky et al. |
| 7,418,476 B2 | | 8/2008 | Salesky et al. |
| 7,426,191 B2 | | 9/2008 | Salesky et al. |
| 7,590,667 B2 | * | 9/2009 | Yasuda et al. ......................... 1/1 |
| 7,593,987 B2 | | 9/2009 | Salesky et al. |
| 7,627,663 B2 | | 12/2009 | Salesky et al. |
| 7,715,331 B2 | | 5/2010 | Salesky et al. |
| 7,716,344 B2 | | 5/2010 | Salesky et al. |
| 7,813,304 B2 | | 10/2010 | Salesky et al. |
| 7,822,859 B2 | | 10/2010 | Salesky et al. |
| 7,836,163 B2 | | 11/2010 | Salesky et al. |
| 7,877,489 B2 | | 1/2011 | Salesky et al. |
| 7,934,002 B2 | | 4/2011 | Salesky et al. |
| 2002/0059327 A1 | | 5/2002 | Starkey |
| 2002/0087859 A1 | | 7/2002 | Weeks et al. |
| 2002/0154210 A1 | * | 10/2002 | Ludwig et al. ............. 348/14.08 |
| 2003/0079160 A1 | * | 4/2003 | McGee et al. ................... 714/39 |
| 2003/0140159 A1 | | 7/2003 | Campbell |
| 2004/0189642 A1 | * | 9/2004 | Frisken et al. ................ 345/443 |
| 2004/0230651 A1 | * | 11/2004 | Ivashin ......................... 709/204 |
| 2004/0255048 A1 | | 12/2004 | Lev Ran et al. |
| 2005/0169197 A1 | * | 8/2005 | Salesky et al. ................ 370/260 |
| 2006/0119618 A1 | * | 6/2006 | Knighton et al. ............. 345/619 |
| 2007/0100939 A1 | * | 5/2007 | Bagley et al. ................. 709/204 |
| 2007/0168423 A1 | * | 7/2007 | Park et al. ..................... 709/204 |
| 2010/0306674 A1 | | 12/2010 | Salesky et al. |

OTHER PUBLICATIONS

International Search Report for Corresponding International Application No. PCT/US2007/010760, Feb. 29, 2008, 4 pages.

Written Opinion for Corresponding International Application No. PCT/US2007/010760, mailed Feb. 29, 2008, 6 pages.

Examination Report for Australian Patent Application No. 2007248571, mailed May 3, 2010, 4 pages.

U.S. Appl. No. 09/523,315, filed Mar. 10, 2000, Salesky.

U.S. Appl. No. 60/014,242, filed Mar. 26, 1996, Salesky.

"CU-SeeMe Software Product," Brought to you by the Cu-SeeMe Development Team of the Advanced Technologies and Planning group of the Network Resources Division of Cornell Information Technologies, pp. 1-8 (1995).

"ORCA Video Conferencing System", Manual Written by the National Oceanic and Atmospheric Administration's Office of Ocean Resources Conservation and Assessment for Operation of the CU-SeeMe System, 26 pages. (1995).

Abdel-Waha et al., "XTV: A Framework for Sharing X Window Clients in Remote Synchronous Collaboration," IEEE Conference, pp. 1-15 (1991).

Chen et al., "Real Time Video and Audio in the World Wide Web", 1995.

Bolot et al., "Scalable Feedback Control for Multicast Video Distribution in the Internet," SIGCOMM 94, London England, pp. 58-67 (1994).

Cox, "Global Schoolhouse Project," http://www.virtualschool.edu/mon/academia (2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pages pp. 99-104 (1993).

Dorcey, "CU-SeeMe Desktop Videoconferencing Software," Connexions The Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

Maly et al., "Mosaic + XTV = CoReview," Computer Networks and ISDN Systems, pp. 1-19 1995.

McCanne et al., "Receiver-Driven Layered Multicast," ACM SIGCOMM, pp. 1-14 (1996).

Sattler, "Internet TV with CU-SeeMe", Book, 323 pages (1995).

Savetz et al., "MBONE: Multicasting Tomorrow's Internet," IDG Books Worldwide, Inc., (1996).

US 5,715,404, 02/1998, Katseff et al. (withdrawn)

* cited by examiner

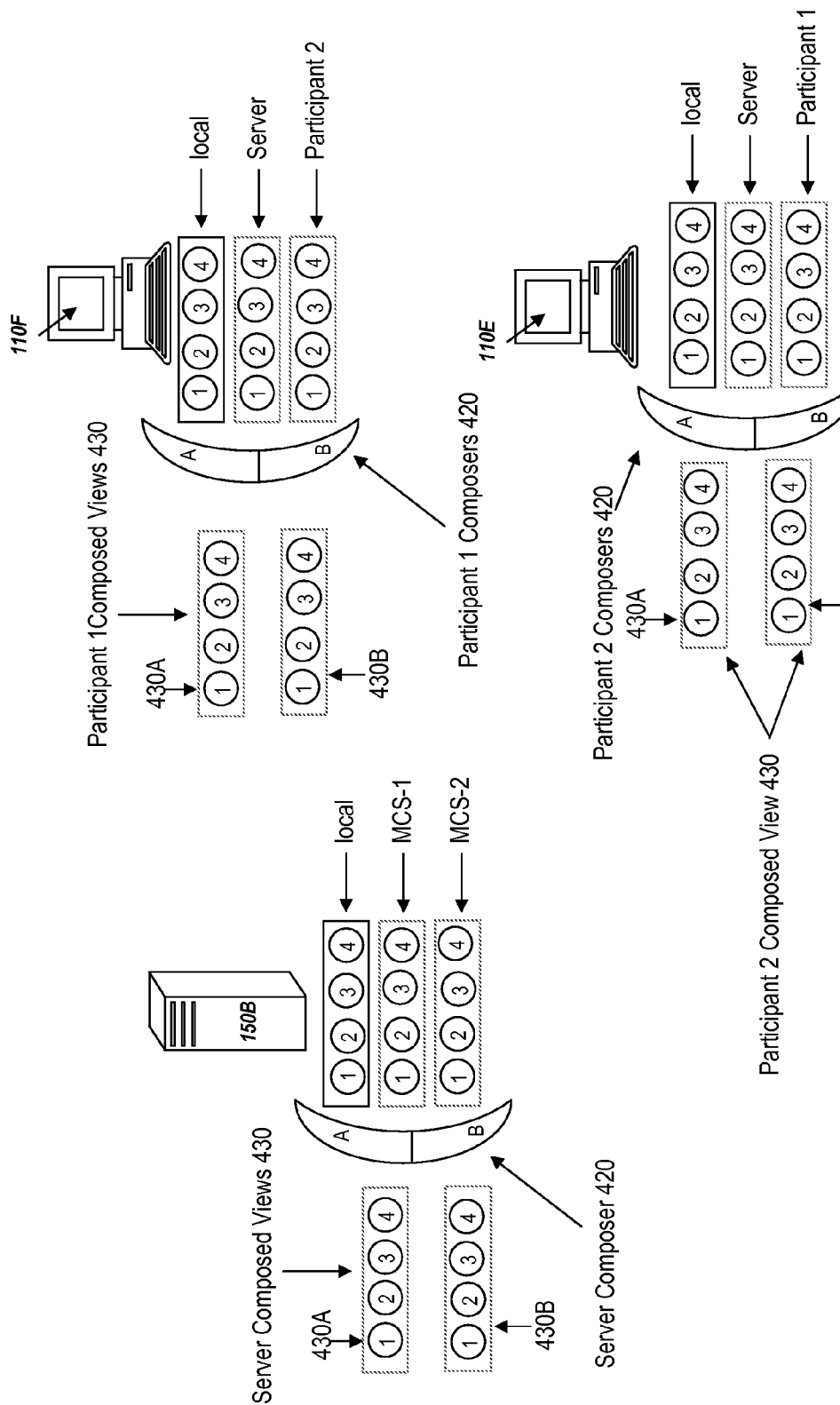

METHODS AND SYSTEMS FOR MANAGING SHARED STATE WITHIN A DISTRIBUTED SYSTEM WITH VARYING CONSISTENCY AND CONSENSUS SEMANTICS

FIELD OF THE INVENTION

The present invention relates to generating consistency and/or consensus about the state of an object. More specifically, the invention relates to generating consistency and/or consensus about the state of an object in a distributed computing system.

BACKGROUND OF THE INVENTION

In distributed systems, deriving a consistent view of shared state is a classic problem. In general consistency refers to two or more distributed entities reaching the same conclusions about the value of a shared variable. Many models for consistency exist in the literature. Each model defines different semantics for what constitutes a consistent view of distributed state. For example, an eventually consistent model stipulates that once changes to the state cease, all entities will converge on the same value for that state. Other models of consistency are more stringent, ensuring that all entities necessarily follow the same sequence of transitions to reach the same eventual state. Most previous work in this area has focused on providing efficient solutions for a specific model of consistency.

SUMMARY OF THE INVENTION

In one aspect, the invention offers a flexible mechanism for defining the specific model of consistency independently for each element of state distributed within the system. Moreover, the same mechanism allows for multiple views of the same state, each with different consistency semantics.

In addition to providing basic consistency, aspects of the invention provide a means for a distributed set of entities to derive consensus on the value of distributed state. Consensus differs from consistency in the fact that the entities involved can detect when a given instance of shared state has reached a consistent value across the system.

Aspects of the invention extend the same mechanism used to derive consistent views to provide consensus within a distributed system. This mechanism allows for different consensus models to be defined independently for each element of state being distributed, and multiple consensus views can be derived for the same element of state simultaneously.

One advantage provided by the invention is that the same mechanism is used for deriving consistency and consensus. In particular, both consistency and consensus are achieved with the same mechanism. Another advantage provided by the invention is a mechanism for deriving multiple views of distributed state with differing consistency and consensus properties simultaneously, and often from the same set of inputs. Also, the granularity at which one can define a consistency model is much finer with the approach presented herein.

In one aspect, the invention features a method of generating a composed view of the state of a plurality of items in a distributed computing system having a plurality of computing devices. The method includes receiving a first plurality of objects that define the state of a first item and a second plurality of objects that define the state of the item, generating a composed view of each of the items, and transmitting the composed views using a reliable multicast protocol to the computing devices of the distributed computing environment.

Each of the first plurality of objects has the same number of fields. Each field of the first plurality of objects stores information that defines the state of the first item. Each of the second plurality of objects has the same number of fields. Each field of the second plurality of objects stores information that defines the state of the second item. A first composer generates the composed view of the first item and a second composer generates the composed view of the second item. Each of the composed views has the same number of fields as each of the plurality of objects related to the item.

In one embodiment, the information stored in the field includes one of the following data types: static state, monotonically increasing state, versioned cyclic state transition, a monotonic set, and non-cyclic state transitions. In further embodiments, the data type of the at least one of the plurality of fields is different from at least some of the others of the plurality of fields In other embodiments, at least one of the first composer and the second composer generates at least one of a consensus or a consistency composed view. In some embodiments at least one first composer and the second composer performs a union operation, an intersection operation, a maximum operation, or a minimum operation on at least one of the fields. In another embodiment different operations are performed on different fields.

In another aspect, the invention features a system for generating a composed view of the state of a plurality of items in a distributed computing system having a plurality of computing devices. The system includes a receiver, one or more composers, and a transmitter. The receiver is in communication with network using a reliable multi-cast protocol and receives a first plurality of objects having the same number of fields. Each of the first plurality represents a state of a first item. Each field of the first plurality of objects stores information that defines the state of the first item. The receiver also receives a second plurality of objects having the same number of fields. Each of the second plurality represents the state of a second item. Each field of the second plurality of objects stores information that defines the state of the second item.

A first composer is in communication with the receiver. The first composer operates on the first plurality of objects and generates a first composed view object of the state of the first item. The first composed view object has the same number of fields as each of the first plurality of objects.

A second composer is in communication with the receiver. The second composer operates on the second plurality of objects and generates a second composed view object of the state of the second item. The second composed view object has the same number of fields as each of the second plurality of objects.

The transmitter is in communication with the composer and a network using a reliable multi-cast protocol. The transmitter transmits, using the reliable multi-cast protocol, the first composed view object and the second composed view object to at least some of the plurality of computing devices of the distributed computing system.

BRIEF DESCRIPTION OF THE DRAWINGS

The foregoing discussion will be understood more readily from the following detailed description of the invention, when taken in conjunction with the accompanying drawings, in which:

FIG. 6A-FIG. 6E depict graphical representations of an embodiment of system that derives a consistent and consensus composed view of a item;

DETAILED DESCRIPTION

Figure 1:
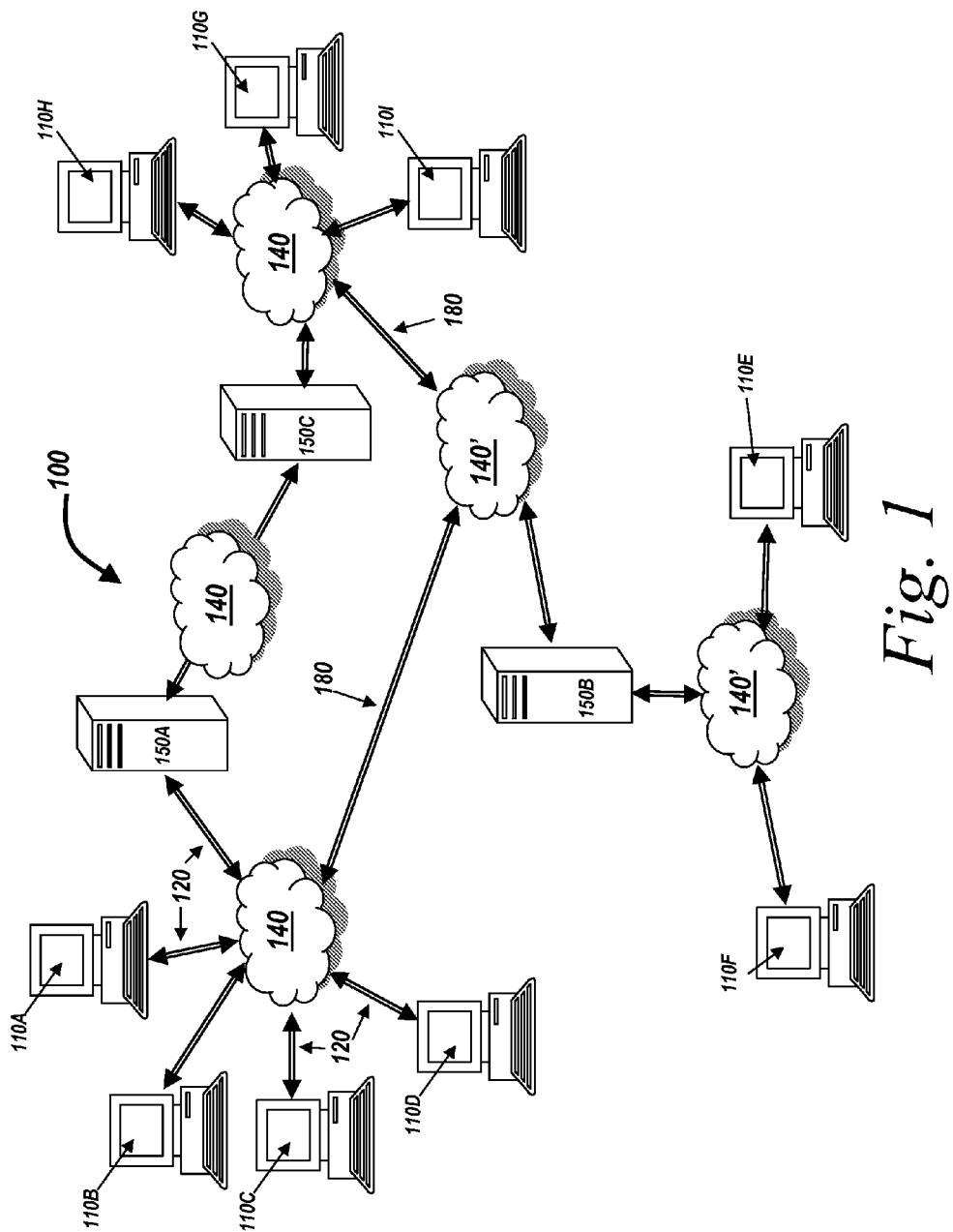
FIG. 1 shows an embodiment of distributed computing environment.

With reference to FIG. 1, a distributed computing environment 100, which can be used for on-line collaboration and the like, includes one or more participant computing devices 110A, 110B, . . . , 110I (hereinafter each participant computing device or plurality of computing devices is generally referred to as participant 110) in communication with one or more server computing devices 150A, 150B, 150C (hereinafter each server computing device or plurality of computing devices is generally referred to as server 150) via one or more communications networks 140. Although FIG. 1, depicts an embodiment of a distributed computing environment 100 having participants 110 and three servers 150, any number of participants 110 and servers 150 may be provided.

Participants 110 and servers 150 can communicate with one another via networks 140, which can be a local-area network (LAN), a metropolitan-area network (MAN), or a wide area network (WAN) such as the Internet or the World Wide Web. Participants 110 connect to the network 140 via communications link 120 using any one of a variety of connections including, but not limited to, standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, and direct asynchronous connections).

In other embodiments, the participants 110 and servers 150 communicate through a second network 140' using communication link 180 that connects network 140 to the second network 140'. The protocols used to communicate through communications link 180 can include any variety of protocols used for long haul or short transmission. For example, TCP/IP, IPX, SPX, NetBIOS, NetBEUI, SONET and SDH protocols or any type and form of transport control protocol may also be used, such as a modified transport control protocol, for example a Transaction TCP (T/TCP), TCP with selection acknowledgements (TCPSACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used. The combination of the networks 140, 140' can be conceptually thought of as the Internet. As used herein, Internet refers to the electronic communications network that connects computer networks and organizational computer facilities around the world.

The participant 110 can be any personal computer, server, Windows-based terminal, network computer, wireless device, information appliance, RISC Power PC, X-device, workstation, minicomputer, personal digital assistant (PDA), main frame computer, cellular telephone or other computing device that provides sufficient faculties to execute participant software. Participant software executing on the participant 110 provides at least the ability to read and write to a shared communication channel established among the participants 110 and the server 150. Additionally, the participant software provides the ability to indicated the state of an object using a well-defined ordering semantic. Said another way, the participant software allows modeling of state data in terms of well-defined ordering semantics.

The server 150 can be any type of computing device that is capable of communication with one or more participants 110 or one or more servers 150. For example, the server 150 can be a traditional server computing device, a web server, an application server, a DNS server, or other type of server. In addition, the server 150 can be any of the computing devices that are listed as participant devices. In addition, the server 150 can be any other computing device that provides sufficient faculties to execute server software. Server software executing on the server 150 provides at least the functionality to create a shared communication channel among the participants 110 and the server 150. Additional functionality provided by the server software includes, but is not limited to, reading and writing to the shared communication channel. Further, the server software provides the ability to indicated the state of an object using a well-defined ordering semantic. Said another way, the server software allows modeling of state data in terms of well-defined ordering semantics.

The participants 110 can communicate directly with each other in a peer-to-peer fashion or through a server 150. For example, in some embodiments a communication server 150 facilitates communications among the participants 110. The server 150 may provide a secure channel using any number of encryption schemes to provide secure communications among the participants. In one embodiment, different channels carry different types of communications among the participants 110 and the server 150. For example in an on-line meeting environment, a first communication channel carries screen data from a presenting participant 110 to the server 150, which, in turn, distributes the screen data to the other participants 110. A second communications channel is shared, as described in more detail below, to provide real-time, low-level or low-bandwidth communications (e.g., chat information and the like) among the participants.

The distributed computing environment includes various objects (not shown) that can be accessed by the participants. Examples of objects can include, but are not limited to, files, computing devices, roles of a on-line meeting, groups that are referenced by access control lists, communications channels, networks, the image of a shared screen, a stream of chat messages, sessions, channels, groups, and the like. Each object can have a state associated therewith. Given the distributed nature of the system, different servers 150 and participants 110 may have different views of the state of an object at the same time.

In addition, depending on the type and use of the distributed computing environment, a variety of actions that participants 100 can perform may be available. One example of an action is the ability to "promote" a participant 100 of an on-line meeting to a presenter from a viewer. In this example, it is desirable to limit access to the "promote" action.

Figure 2:
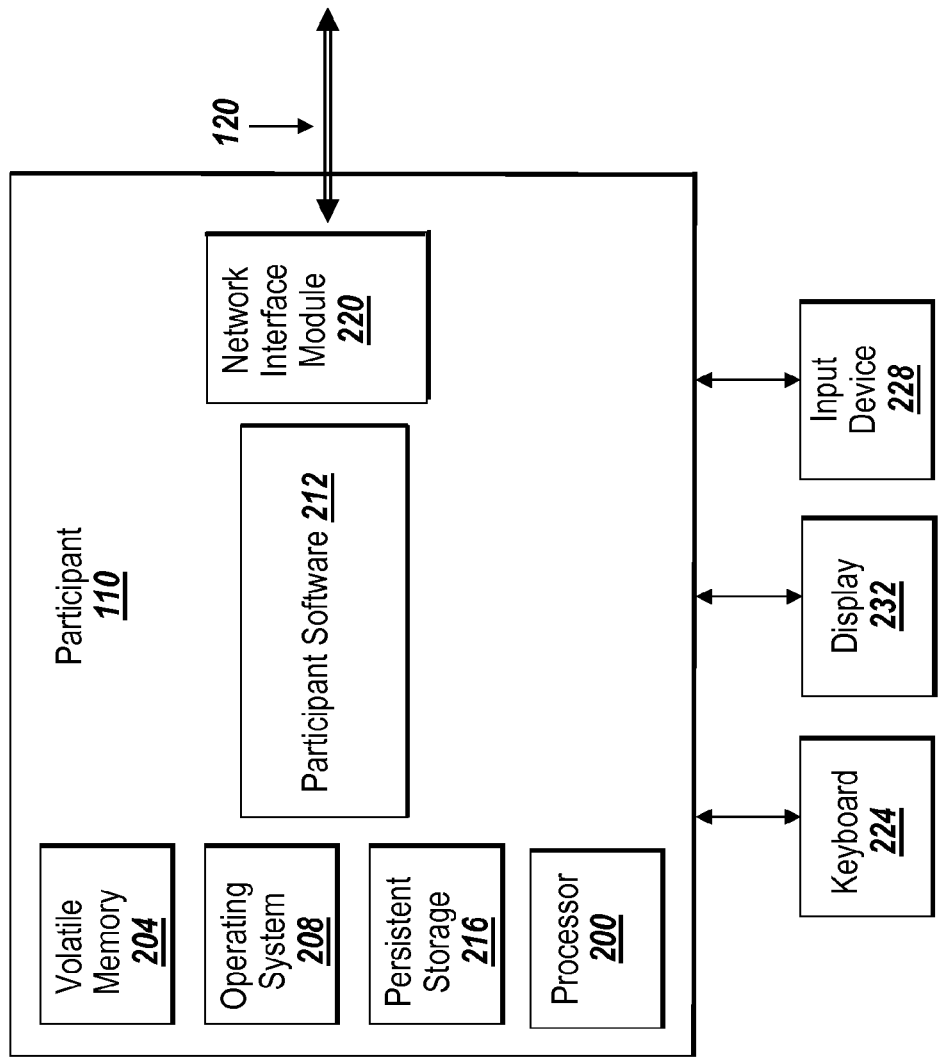
FIG. 2 shows an embodiment of a participant computing device of the distributed computing environment of FIG. 1.

FIG. 2 depicts a conceptual block diagram of a participant 110. It should be understood that other embodiments of the participant 110 can include any combination of the following elements or include other elements not explicitly listed or less than all the elements listed. In one embodiment, each participant 110 typically includes a processor 200, volatile memory 204, an operating system 208, participant software 212, a persistent storage memory 216 (e.g., hard drive or external hard drive), a network interface 220 (e.g., a network interface card), a keyboard 224 or virtualized keyboard in the case of a PDA, at least one input device 228 (e.g., a mouse, trackball, space ball, light pen and tablet, touch screen, stylus, and any other input device) in electrical communication with the participant 110, and a display 232. The operating system 116 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS SERVER 2003, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 116 can run on a virtualized computing machine implemented in software using virtualization software such as VMWARE.

The participant software 212 is in communication with various components (e.g., the operating system 208) of the participant 110. As a general overview, the participant software 212, in cooperation with server software (shown in FIG. 3 below) provides a single mechanism that achieves both consistency and consensus regarding the state of an object provided by the distributed computing environment. Another feature provided by the participant software 212 is the ability to specify access control policies that are then associated with objects and actions of the distributed computing environment 100. In addition, the participant software 212 can enforce the access control policies.

Figure 3:
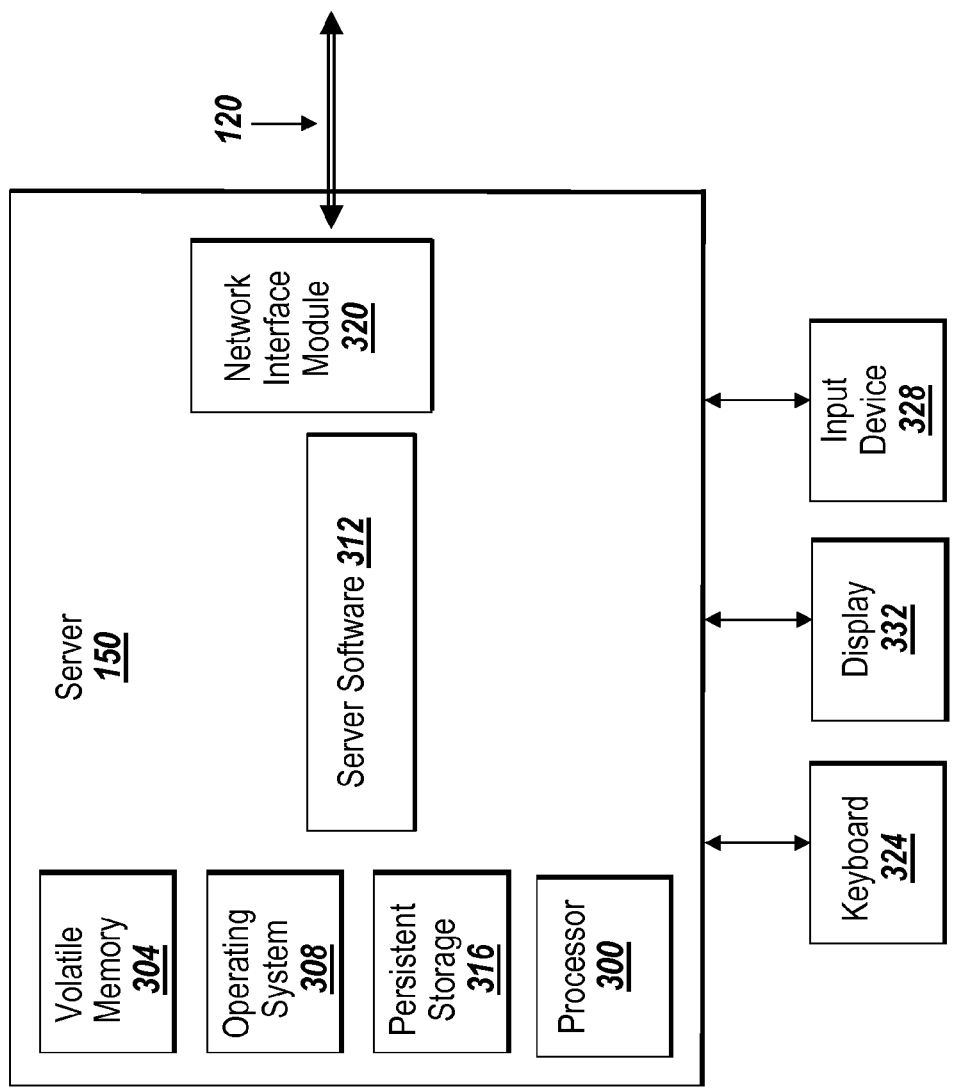
FIG. 3 shows an embodiment of a server computing device of the distributed computing environment of FIG. 1.

With reference to FIG. 3, an embodiment of a server 150 is described. It should be understood that other embodiments of the server 150 can include any combination of the following elements or include other elements not explicitly listed. The server 150 includes a processor 300, a volatile memory 304, an operating system 308, server software 312, persistent storage memory 316, a network interface 320, a keyboard 324, at least one input device 328 (e.g., a mouse, trackball, space ball, bar code reader, scanner, light pen and tablet, stylus, and any other input device), and a display 332. In one embodiment, the server operates in a "headless" configuration. The server operating system can include, but is a not limited to, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS SERVER 2003, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 116 can run on a virtualized computing machine implemented in software using virtualization software such as VMWARE.

The server software 312 is in communication with various components (e.g., the operating system 308) of the server 150. As a general overview, the server software 312, in cooperation with the participant software 212, provides a single mechanism that achieves both consistency and consensus regarding the state of an object provided by the distributed computing environment. The server software 312 enforces access control policies associated with protected objects and actions that are maintained within the distributed computing environment 100. In other embodiments, the participant software can enforce the access control policies.

Figure 4:
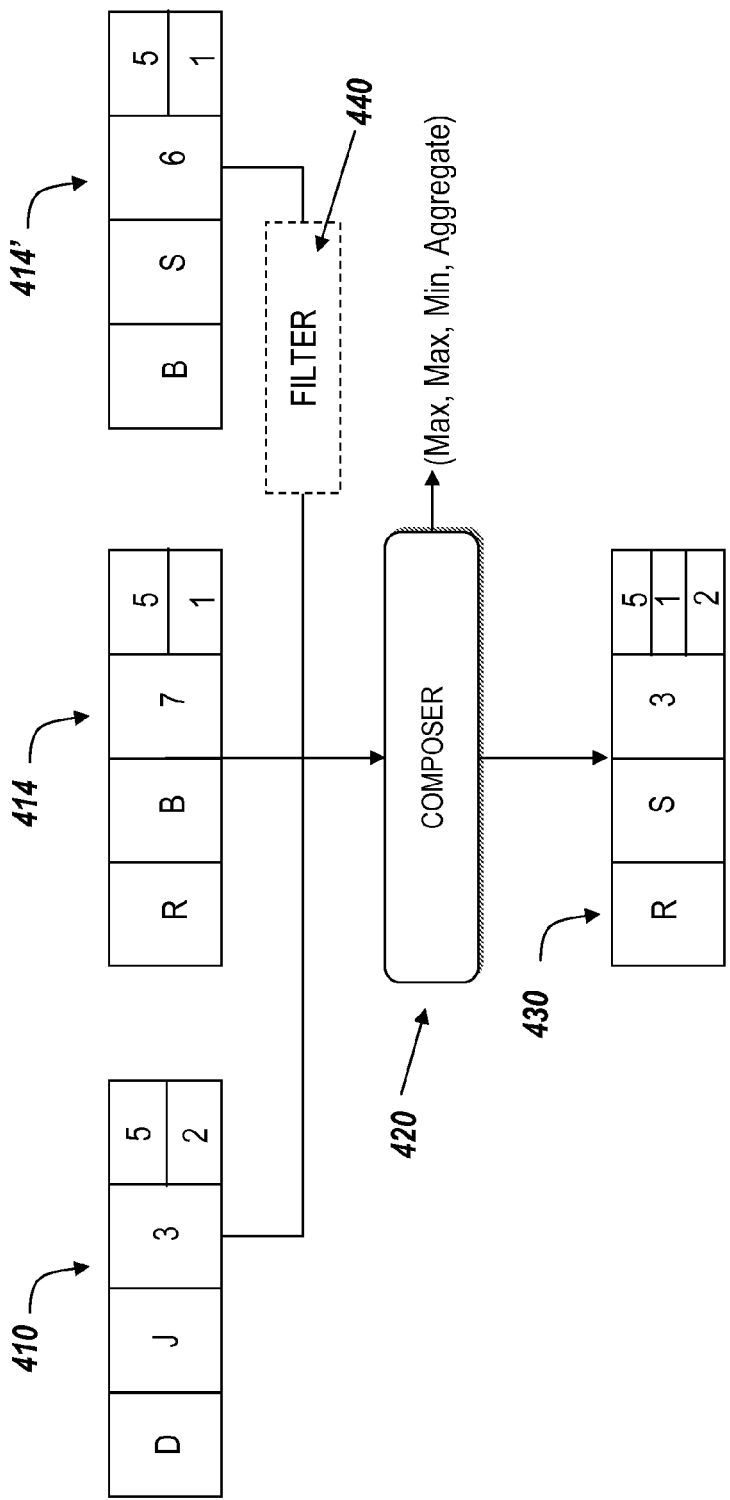
FIG. 4 depicts an embodiment of a graphical representation of a composed view.

With reference to FIG. 4, a block diagram depicts the operation of a composer 420, that is, a mechanism for combining a local input 410 and remote inputs 414, 414' for a single object in such a manner as to derive a consistent and/or consensus view of that object. A resulting composed view 430 of the state of the object is created by the composer 420 responsive to the inputs 410, 414, 414'. As used herein, a local input 410 refers to the representation of the state of the object as known and stored by the participant 110 or server 150. Remote inputs 414 refer to the representations of the state of the same object as known and stored by the other participants 110 and servers 150 of the distributed computing environment 100. In one embodiment, the state of the object refers to the "operational" state of an object. For example, operational state can refer to the state of a collaboration session, load balancing of the session, and the role of certain participants of the session.

For each type of state represented within the distributed computing environment 100, one or more composers 420 are defined that derive a composed view 430 from the local 410 and remote inputs 414, 414 that represent the state of that object. Each composer 420 can enforce any arbitrary semantics for consistency and/or consensus, Thus, a distributed computing environment 100 implementing principles of the invention allows consistency and consensus semantics to be defined at a finer granularity than in existing systems. It should be understood that, multiple composed views 430 can be composed from the same set of local 410 and remote inputs 414 using by defining multiple composers 420 for that set of inputs. This ability results in a distributed computing environment 100 that supports multiple consistency and consensus semantics simultaneously. In various embodiments, different singular or combinations of consistency semantics are supported. Examples of consistency semantics include, but are not limited to, eventual consistency, casual consistency, and sequential consistency.

As shown, the local input 410, the remote inputs 414, 414' and the resulting composed view 430, include one or more elements, also referred to as fields throughout the specification, that define the state of the object. The content of each field is stored in the field using a well-defined ordering semantic. The ordering semantic for each field can be different or the same as any other field of the object. Examples of well-defined ordering semantics, include, but are not limited to, monotonically increasing or decreasing numbers, acyclic state transitions, monotonic sets, and the like. It should be understood that each field can have one or more sub-fields (not shown for the sake of simplicity) which can be grouped into a structure. An ordering relation on the group can be imposed in terms of versions, lamport clocks, vector clocks and the like. For example, a field can be defined by two sub-fields on storing a version number and the other storing cyclic state transitions. Grouping a monotonically increasing number with a cyclic state transitions provides a well-ordered semantic for the field. By way of example, in FIG. 4, each object has four elements that define the object's overall state. In one embodiment, each element is identifiable by some unique key, such as a name. Thus the corresponding elements from each of local input 410 and the remote inputs 414, 414', represent the same piece of distributed state for the same object and can be identified and presented to the composer 430 as a group. The composer 430 then derives a single output element for the composed view 430 from the group of elements according to the internal logic of the composer 430. Different composers 430 can be defined to derive eventually consistent views, logically ordered views (i.e., Lamport clocks or vector clocks), full consensus views, super majority consensus views, as well as partial and majority consensus views.

By way of example and with continued reference to FIG. 4, the local input 410 of the state of an object has four elements. Each of the remote inputs 414, 414' also has four elements. In this example, the fourth element is an array. The composer 420 is defined as a Maximum, Maximum, Minimum, Aggregation composer. As such, the composer will determine the maximum of the three first elements, the maximum of the three second elements, the minimum of the three third elements, and the aggregation of the three fourth elements. The composed view 430 shows the results of the operation of the composer 430. It should be understood that other composers can also operate on the inputs to determine the consistency and/or consensus of the inputs. For example a union and/or intersection operation can be performed on the inputs.

In some embodiments, filters 440 can be added to the general model described above to allow for an added level of system flexibility. Often, some remote inputs 414 have to meet certain requirements before being considered for composition by the composer 430. For example, in an access control situation is may be desirable to filter some of the inputs. As a general example, some participants 110 are only allowed to change the state of a distributed object in certain well-defined ways. To provide this functionality, a filter 430 is defined that disallows unauthorized changes from being propagated to the composer 430. It should be understood that a filter 430 can also be applied to the composed view 430 before the composed view 430 is published to the other participants 110 and servers 150 using a reliable multicast protocol as a means to limit the amount of information exposed to participants 110 and servers 150 with restricted access.

Figure 5:
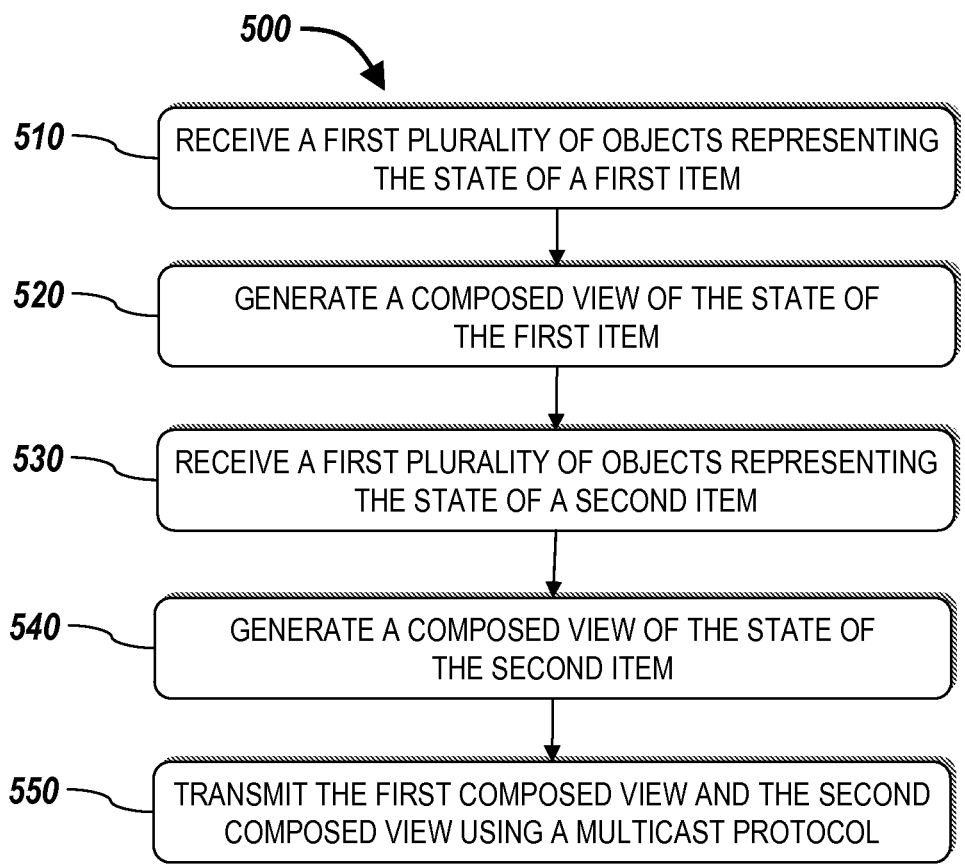
FIG. 5 shows a flow chart of an embodiment of a method of generating a composed view of a item.

With reference to FIG. 5 a method 500 of generating a composed view 430 of the state of an object is shown and described. In general, a particular consistency and consensus semantic can be defined for a given view by deciding which inputs to include in the composition and which composer to use to derive the view. Different composers can be used to derive different views from the same set of inputs. In one embodiment, the method 500 includes receiving (STEP 510) a first plurality of objects that represent the state of a first item, generating (STEP 520) a composed view of the state of the first item, receiving (STEP 530) a second plurality of objects that represent the state of the a second item, generating (STEP 540) a composed view of the state of the second item, and transmitting (STEP 550) each of the composed views using a reliable multicast protocol to computing devices of the distributed computing environment 100.

In one embodiment, the composer 430 receives (STEP 510 and STEP 530) each of the first item and the second item represent a different type of item and therefore a different type of state. In one embodiment, the receiving occurs at the server 150. In another embodiment, the receiving occurs at one or more of the participants 110. In some embodiments, different items are received at different times. In another embodiment, the items are received at the same time.

In one embodiment, the composer 430 generates (STEP 520 and STEP 540) the composed view by operating on all the fields of each of the plurality of objects. In another embodiment, each of the composers operates on a portion of the fields of each of the plurality of objects. In some embodiments, the composers generate a consistency composed view of the plurality of objects. In other embodiments, the composers generate a consensus view of the plurality of objects. In some configuration, the composers generate a combination of consistency and consensus composed views. In one embodiment, the composer 430 generates a composed view when the composer receives a single updated item. In another embodiment, the composer 430 generates a composed view after receiving multiple items.

In one embodiment, transmitting (STEP 550) occurs using the Internet Group Management Protocol (IGMP). In other embodiments, protocols such as Protocol Independent Multicast (PIM), Distance Vector Multicast Routing Protocol (DVMRP), Multicast OSPF (MOSPF), Multicast BGP (MBGP), Multicast Source Discovery Protocol (MSDP), Multicast Listener Discovery (MLD), and GARP Multicast Registration Protocol (GMRP) can be used. It should be understood that other reliable multicast protocols can also be used. In other embodiments, unicast or other protocols can be used.

With reference to FIG. 6A through FIG. 6E an example of deriving eventual consistency of a monotonic group is shown and described. As used herein, monotonic refers to changing in only one direction; that is either strictly rising or strictly falling, but not reversing direction. In the following example, a monotonically increasing group is used. That is, members can only be added to the group and once added not removed.

Figure 6A:
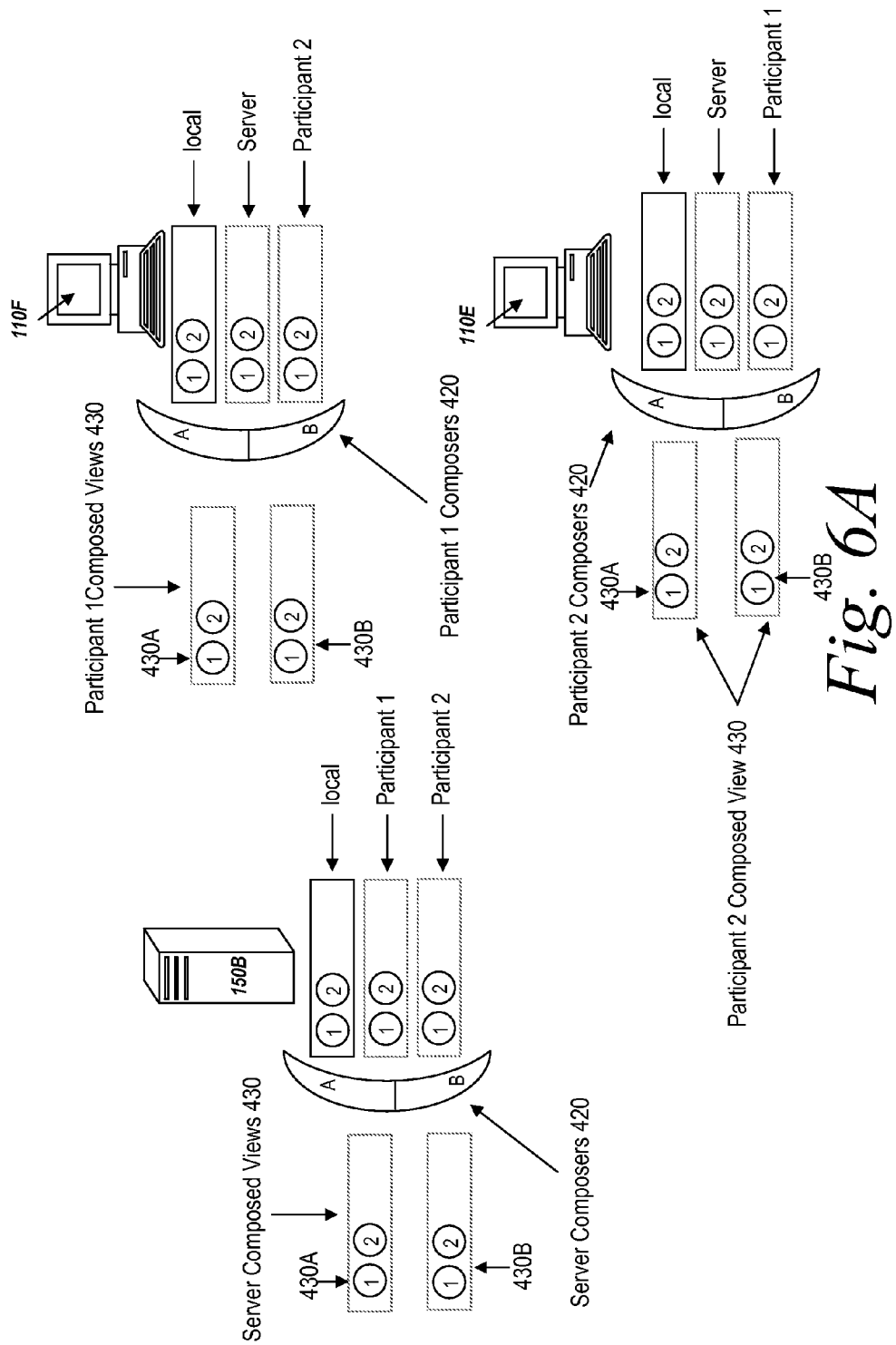

Starting with FIG. 6A, in the example there is a server 150B, a first participant 110F, and a second participant 110E, each of which has a local view of the monotonically increasing group 410. Each participant 110 and the server 150 includes two composers 420A, 420B. The first composer 420A generates an aggregate view of the group by performing a union of the inputs. The second composer 420B determines what elements are in consensus among the inputs by performing an intersection of the inputs. Said another way, the second composer 420B determines which elements of the group have been seen by the other participants. As shown, each of the server 150 and the participants 110 shares the same view of the state of the members of the group. That is each of the composed views 430 includes member 1 and member 2. The first composed view 430A (i.e., the aggregate view) shows that the group contains member 1 and member 2. The second composed view 430B (i.e., the consensus view) shows that each of the participants 110 agrees that member 1 and member 2 are part of the group.

Figure 6B:
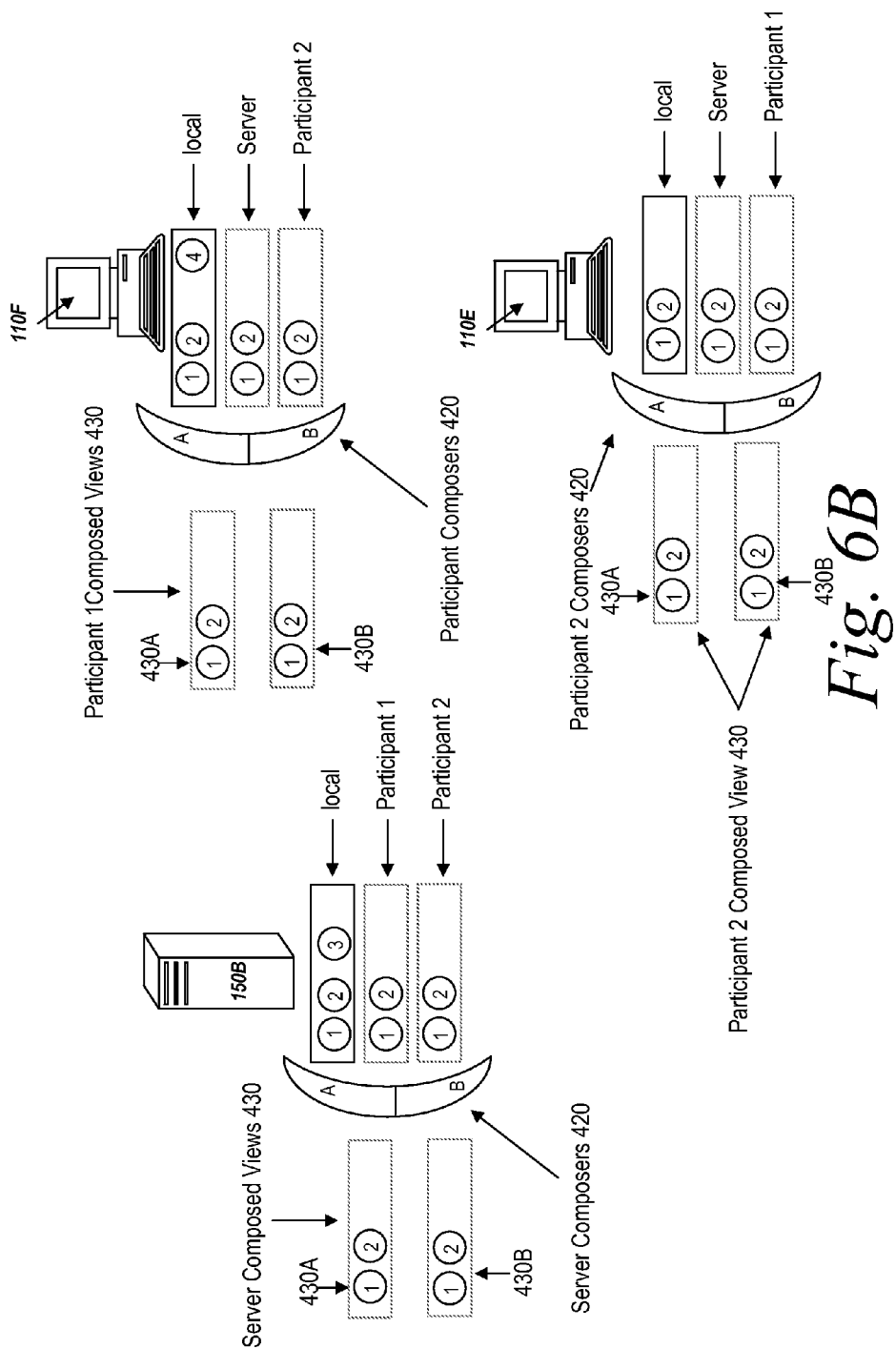
Figure 6C:
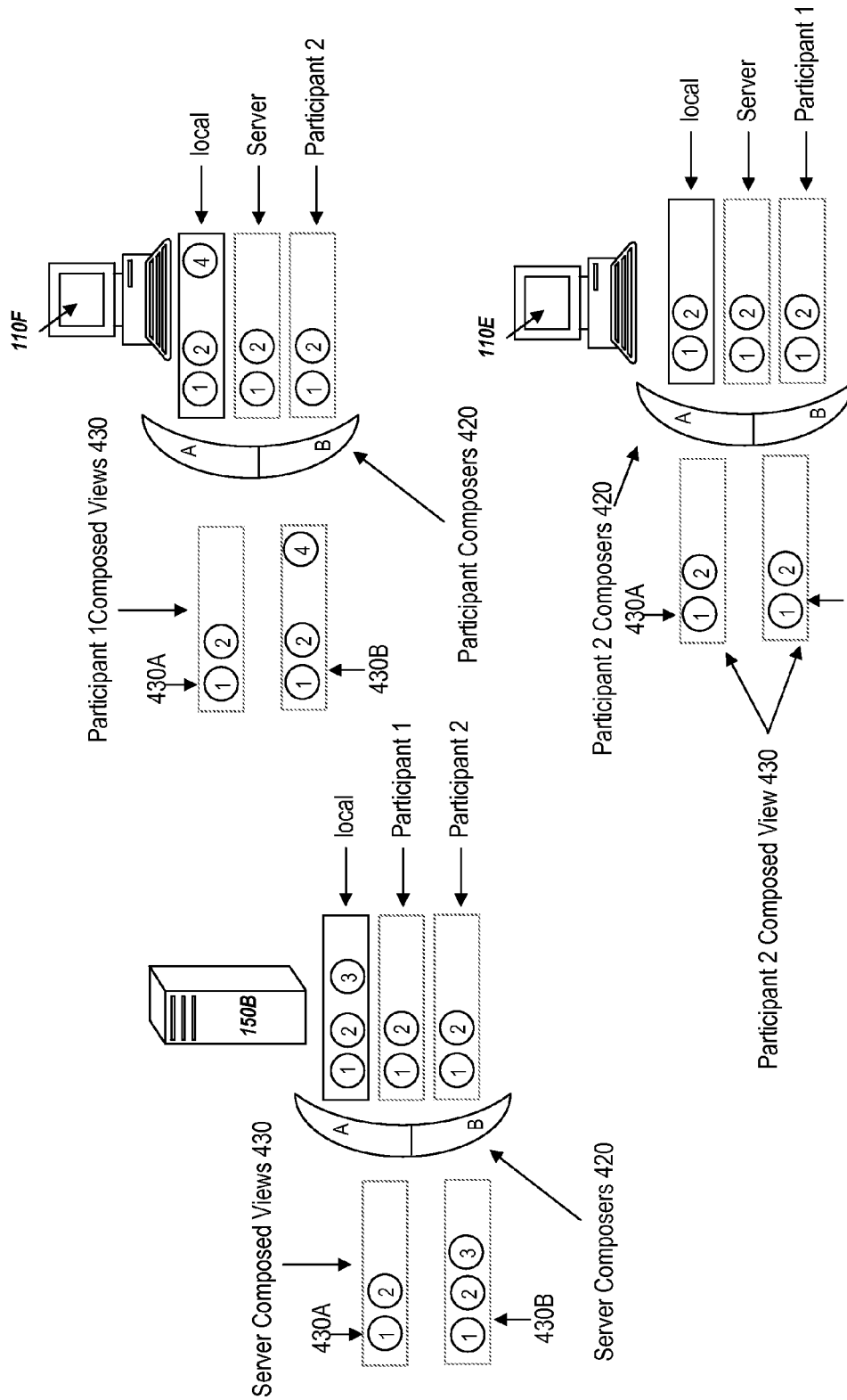

In FIG. 6B, the server 150 adds member 3 to the group and the first participant adds member 4 to the group. At an appropriate time, each of the composers re-evaluates the inputs. As shown in FIG. 6C, the resulting aggregate view 430A of the server 150B shows that the group consists of member 1, member 2, and member 3. The resulting aggregate view 430A of the first participant 110F shows that the group contains member 1, member 2, and member 4. However, the consensus views 430B of each of the participants 110 and the servers 150 show that each of the participants 110 and the server 150 are aware that member 1 and member 2 are a part of the group. Said another way, the intersection of the inputs reveals that each input includes member 1 and member 2.

Figure 6D:
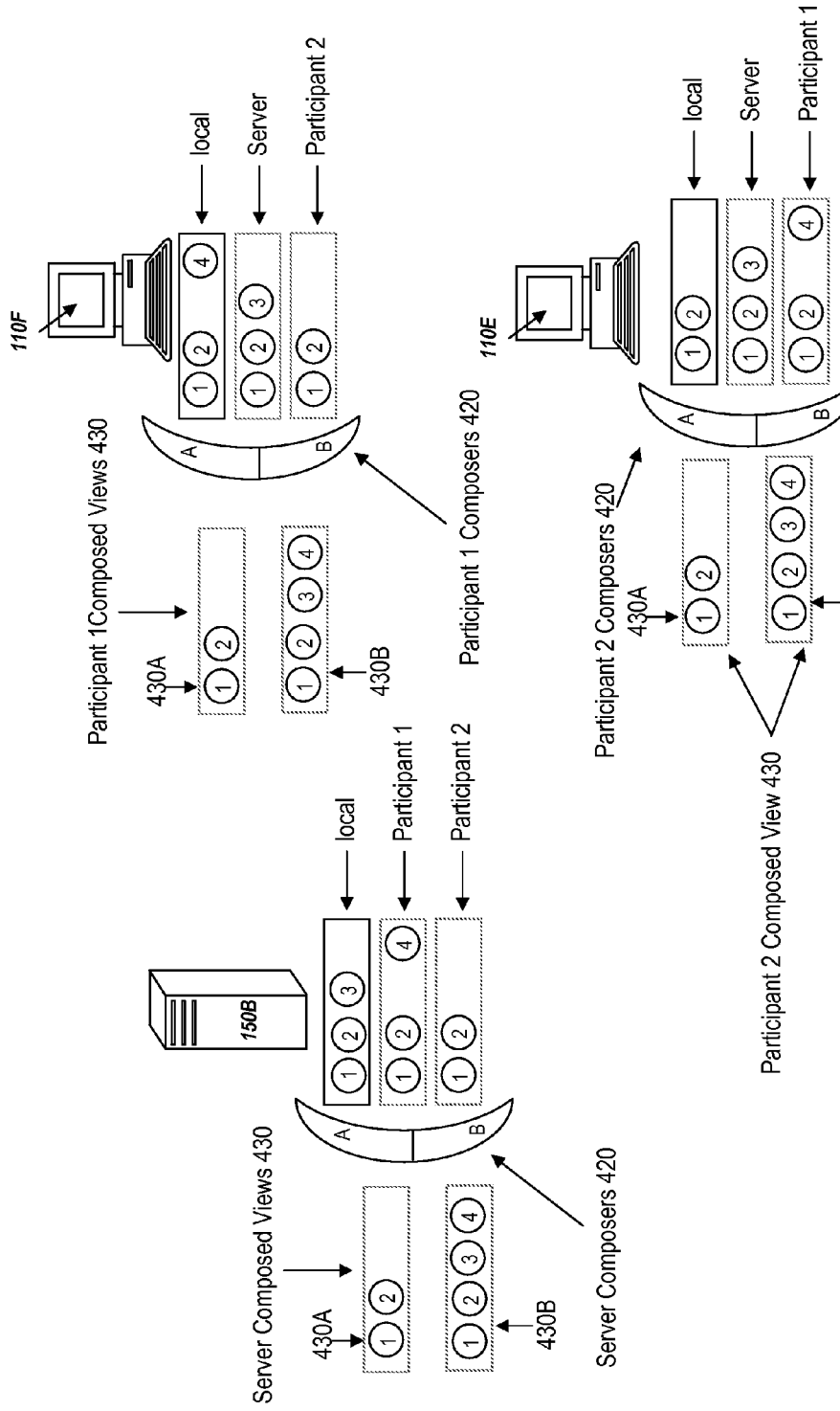

As shown in FIG. 6D, each of the resulting aggregate views 430A is forwarded to each of the server 150B, the first participant 110F, and the second participant 110E. As shown, the output of the aggregation composer 420A of each of the server 150, the first participant 110F, and the second participant 110E indicates that the group contains member 1, member 2, member 3, and member 4. However, the consensus view 430B shows that server 150 and the participants 110 agree that only member 1 and member 2 are part of the group. That is, each of the inputs contains at least member 1 and member 2. After generating the aggregate view 430A, the server 150 and the participants 110 publish their respective aggregate views 430 to each other.

As shown in FIG. 6E, each of the inputs at each of the server 150 and the participants 110 is the same. As a result, the aggregate view 430A at each of the participants 110 and the server contains member 1, member 2, member 3, and member 4. In addition, there is consensus among the participants 110 and the server 150 that the set contains member 1, member 2, member 3, and member 4 as shown by each of the consensus views 430B.

Although shown as achieving eventual consistency, it should be understood that a partial consistency model can be applied. For example, if interest exists in only members 3 and 4 of the group, a composer can be constructed to operate to determine if only those two members are present. It should be apparent that other consistency and consensus models can also be applied.

One use of preparing composed views 430 is to achieve consistency and consensus of about which participant can access which objects of in the distributed computing environment 110. In one embodiment, access control lists are used define access control policies for objects within the distributed computing environment 100. In one embodiment, an ACL is time-invariant. That is, the ACL does not change with time. It first glance, this may seem limiting; however, the ACL is defined in terms of mutable groups. The groups are not time-invariant. In such a system, the composers 430 derive consistency and consensus among the mutable groups referenced in the ACL. A composer 430 can be constructed to operate on the groups that are referenced in the ACL because the groups are defined using a well-defined ordering semantic. For example, a group can be monotonically increasing.

In order to enforce the ACL, the server software 312 or participant software 212, which ever is the policy enforcement point, evaluates the ACL to determine if the transitive closure contains the participant. If the participant requesting access to the object of the distributed computing environment 100 is found in the ACL, than access to the object is granted. In one embodiment, an ACL can also be composed of two groups of ACLS, an "allow" ACL and a "deny" ACL. In such an embodiment, the deny ACL is evaluated first to determine if the requesting principal should be denied access. If the requesting principal is not present in the deny ACL, the allow ACL is evaluated. Both sets can be monotonic. That is because users are not removed to deny access to a protected object. Instead, the user is added to the "deny" group.

An object, as used within the context of the distributed computing environment 100, includes but is not limited to files, groups, communications channels, computing resources, participants, other resources, or any other object, item, data, or network, that requires, or to which, access is controlled. When a protected object is instantiated, the authority for the object specifies one ACL for every mode of access to the object that will be protected (read, write, etc). The protected object is generally the enforcement point for its own policy, and is responsible for establishing the identity of a requestor and calling on participant software 212 or server software 312 to evaluate the appropriate ACL before granting access.

As used here in, transitive closure refers to an extension or superset of a binary relation such that whenever (a,b) and (b,c) are in the extension, (a,c) is also in the extension. Said another way, in mathematics the transitive closure of a binary relation R on a set X is the smallest transitive relation on X that contains R. For any relation R the transitive closure of R always exists. To see this, note that the intersection of any family of transitive relations is again transitive. Furthermore, there exists at least one transitive relation containing R, namely the trivial one: X×X. The transitive closure of R is then given by the intersection of all transitive relations containing R.

As used herein, the transitive closure of an ACL refers to the set of principals that are transitive closure contained in the ACL. As used herein, transitive closure contains refers to the transitive closure of the contains relation. As used herein, the "contains" relation refers to the standard definition of the includes relation in set theory: A set A contains x if x is a member of A. The evaluation of the transitive closure contains relation can be performed using various techniques. For example, calculating closure of an associated graph and checking if the node corresponding to the principal occurs in the graph, recursive evaluation of membership in the groups listed in the ACL, creating a nested list and flattening the list and then checking for membership, and the like.

For example, assume a set A includes two group G1 and G2 (i.e., A={G1,G2}). Assume that group G1 includes participants "a", "b", and "c" (i.e., G1={a, b, c}). Assume that group G2 contains a participant "d" and another group G3 (i.e., G2={d,G3}). Assume group G3 include participants "e" and "f" (i.e., G3={e,f}). Using these assumption, the transitive closure of A is the set {a, b, c, d, e, f}. In one embodiment, using a flattening approach consists of writing the set A as A=[a, b, c][d,[e,f]]] and then flattening the set (i.e., removing the nested parenthesis to make a simple list out of a nested list). This results in the set Aflat as Aflat=[a, b, c, d, e, f]. Aflat if the transitive closure of the ACL. The policy enforcement point then checks if the principal belongs to the set Aflat.

Figure 7:
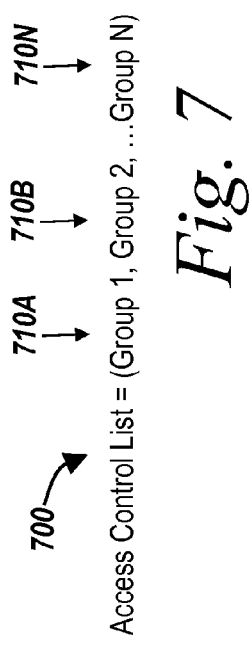
FIG. 7 is an embodiment of a graphical representation of a constructed access control list.

With reference to FIG. 7 an exemplary ACL 700 is shown and described. In one embodiment, the ACL includes one or more groups 710A, 710B, 710 N (hereinafter each group of plurality of groups is referred to as group 710). Each group is mutable, that is, it can be changed over time. However, there are different types of groups that are defined to behave in specific ways. One example of such a group is the monotonically increasing group as previously described. As previously shown, deriving consistency and consensus of a monotonically increasing group can be accomplished using composed views. This is because the groups are expressed using a well-defined ordering semantics. Another type of group is a versioned group. In a versioned group, the membership and number of members can change in a non-monotonic manner. However, a well-defined ordering semantic can be added (e.g., a monotonic identifier) to the group to provided an identification as to the state of the group. For example assume a group can consist of a combination of participants A, B, and C. At one time the group can be A and B. At a later time, the group can be A and C. Subsequently, the group can return to A and B. Although the members of the group are the same as before, this combination represents a different "version" of the group, when viewed temporally. If a monotonic identifier is associated with each version of the group, identifying different versions of the group becomes simplified.

In one embodiment, group membership monotonically increases. In another embodiment, group membership monotonically decreases. In yet another embodiment, group membership is a versioned group. In still another embodiment, group membership is comprised of a single principal. In various embodiments, the requests to access a protected object originates from an attendee of an on-line meeting or the attendee of a webinar.

In one embodiment, the list of group identifiers includes, but is not limited to, participant, superuser, presenter, gone from session, authenticated participants, authenticators, end-to-end security initializer, author, session keep-alive, and the like. It should be understood that any unique identifier can be used to identify a group.

Figure 8:
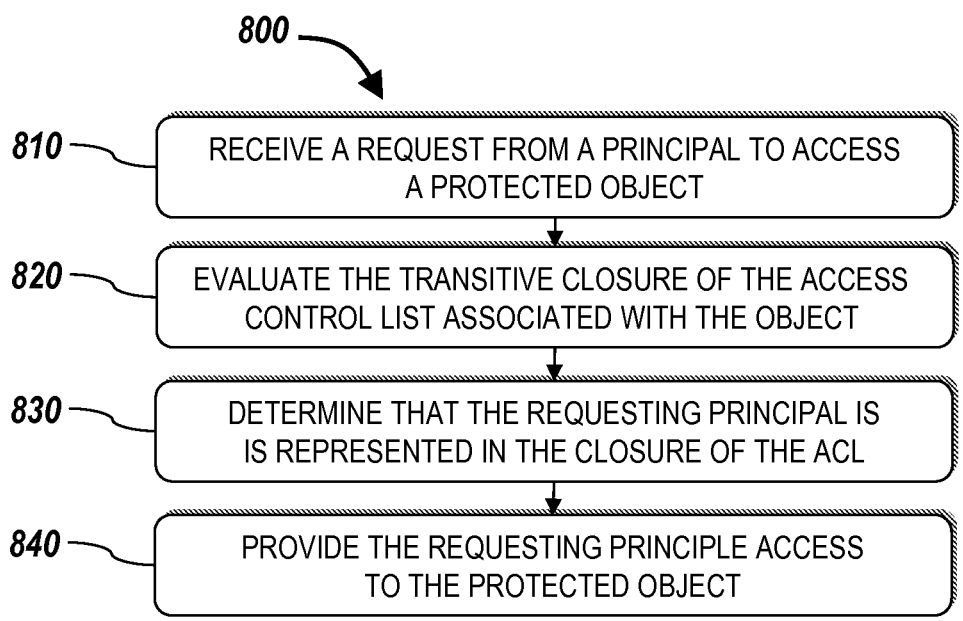
FIG. 8 shows a flow chart of an embodiment of a method of control access to objects of the distributed computing environment.

With reference to FIG. 8 a method 800 of specifying and facilitating the consistent enforcement of access control policies associated with protected objects of the distributed computing environment 100 is described. In one embodiment, the method includes receiving (STEP 810) a request from a principal to access a protected object. The protected object is associated with an access control list. The access control list is a time-invariant list of one or more group identifiers. As used herein principal refers to an entity (e.g., participant 110, server 150, and the like) that requests access to a protected object. Also, as used herein, an identifier refers to a unique value used to identify an object The method 800 also includes evaluating (STEP 820) the transitive closure of the list of group identifiers associated with the protected object. Evaluating the transitive closure result in the identification of at least one principal authorized to access the protected object. The method 800 also determines (STEP 830) that the requesting principal is represented in the closure of the ACL and provides (STEP 840) access to the protected object.

In one embodiment, a participant 110 receives (STEP 810) the request to access the protected object. In another embodiment, a server 150 receives (STEP 810) the request. The requests can be issued by end-users of the participants 110 and servers 150. In other embodiments, requests are transferred between the various computing devices of the distributed computing environment 100.

In one embodiment, a server 150 evaluates (STEP 820) the transitive closure. In another embodiment, a participant 110 evaluates (STEP 820) the transitive closure. It should be understood that various combinations of participants and servers can cooperate to evaluate the transitive closure.

Various techniques can be used to determine (STEP 830) that the requesting principal is represented in the transitive closure. Examples include, but are not limited to, providing a binary (1 or 0), providing a "yes" or "no", and providing a "true" or "false" indication.

Depending on the object to be accessed, various techniques can be used to grant access (STEP 840) to the protected object. For example, the object can be transmitted to the principal. Others techniques include creating a copy of the object and transmitting that copy the principal or allowing access to a protect drive or area with in the drive. In another embodiment, granting includes accepting commands from a principal and acting upon the received commands. For example, a command to end an on-line meeting is executed when an authorized participant requests the termination of the meeting.

Figure 9A:
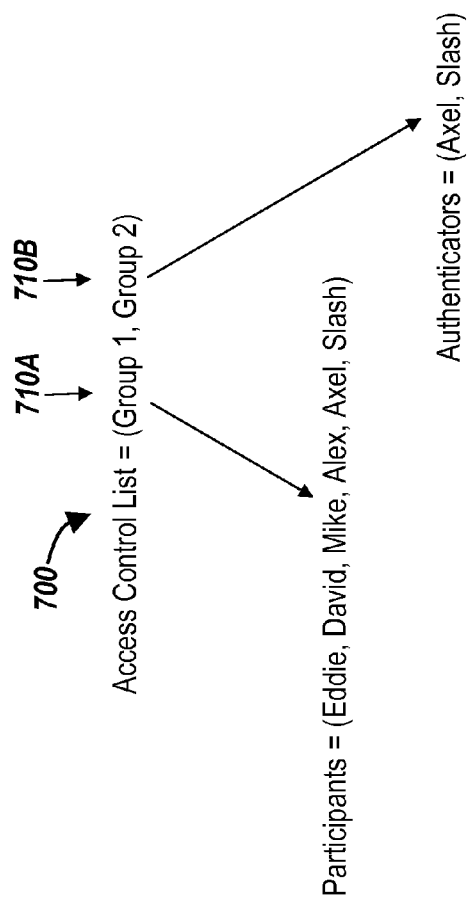
FIG. 9A is an embodiment of a graphical representation of a groups that are part of an access control list.

As shown in FIG. 9A, an ACL 700 has a first group 710A and a second group 710B. The first group 710A is a versioned group and the second group 710B is a monotonically increasing group. In this example, the first group 710A represents the participants to an on-line meeting or webinar. The first group 710 consists of six members EDDIE, DAVID, MIKE, ALEX, AXEL, and SLASH. The second group 710B represents the authenticators for the on-line meeting or webinar. Once promoted or designated as an authenticator, that participant can not be removed as an authenticator. As such, the second group is a monotonically increasing group. Initially, the second group 710B includes two authenticators AXEL and SLASH.

Figure 9B:
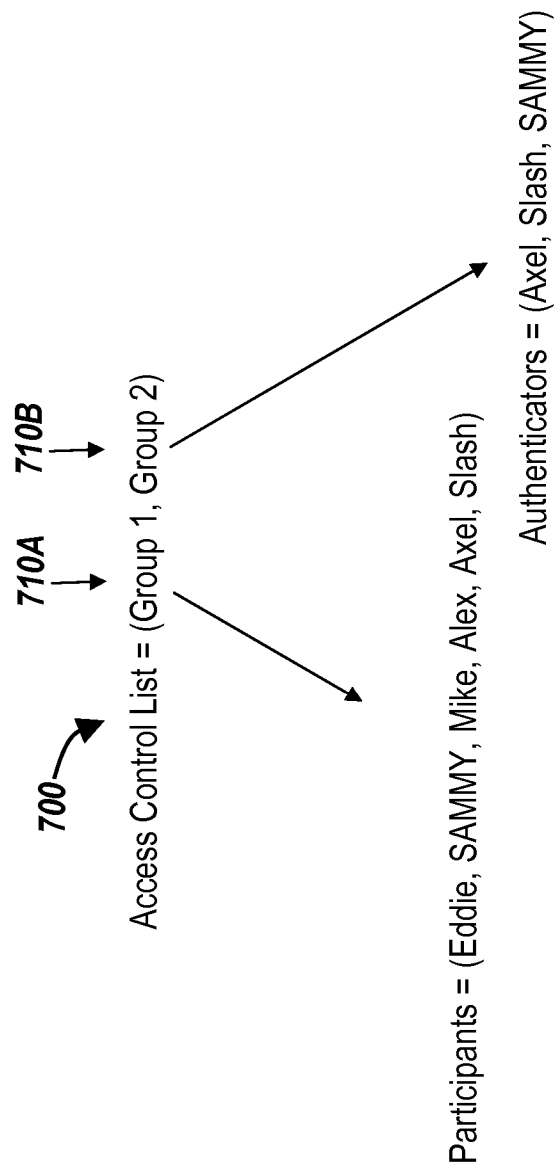
FIG. 9B is another embodiment of a graphical representation of a groups that are part of an access control list.

With reference to FIG. 9B, assume during an on-line meeting another principal (e.g., SAMMY) wishes to join the meeting. As such, SAMMY sends a request for access to the meeting to one of the authenticators, for example AXEL. In response to the request, the server software 312 or participant software 212 evaluates the transitive closure of the ACL 700 and determines that AXEL is an authenticator. Therefore, AXEL grants SAMMY access to the meeting. In turn, SAMMY is listed as a member of the first group 710A. From that point on, SAMMY is a member of the second group 710B and has all the rights and privileges of that group. It should be noted that participant DAVID is no longer a member of the first group 710A. This could be because the participant realized that the participant request and was granted access to the wrong on-line meeting or for some other reason.

Once SAMMY becomes a participant to the meeting, SLASH may want to promote SAMMY to authenticator. To achieve this, SLASH requests permission from the server 150 to add SAMMY to the authenticators group. Again, the server software 312 or the participant software 212 evaluates the transitive-closure of the second group 710 and determines that SLASH is an authenticator and allows the promotion of SAMMY. From that point on, SAMMY is a member of the second group 710B and has all the rights and privileges of that group.

Principals within an access control domain are represented by unique identifiers. Groups are sets of zero or more principal identifiers, and are themselves protected objects (reading and writing the group's contents are both protected actions). There are two fundamental kinds of groups: Identity groups represent exactly one principal and are time-invariant. Application groups represent zero or more principals and may vary with time. They may be versioned (membership varies arbitrarily with time) or monotonic (membership may only increase with time).

At the time a protected object is instantiated, the policy authority for the object specifies one ACL for every mode of access to the object that will be protected (read, write, and the like). The computer system of the protected object is generally the enforcement point for the policy of the protected object. The computer system is responsible for establishing the identity of a requestor and calling on participant software 212 or server software 312 to evaluate the appropriate ACL before granting access.

One exemplary implementation for principles of the invention is in an on-line collaboration product which performs on-line meetings or webinars. An on-line meeting consists of one or more participants 110 that communicate through one or more communication server 150. In an on-line meeting, one of the participants is a presenter and controls the flow of the meeting. A presenter converts a slide presentation into a series of page-by-page images. As the presenter displays a slide, the page image representing that slide is transmitted to all viewers. In many embodiments, each slide is represented by multiple data packets and transmitted over specific channel designated for screen sharing data. Each of the participants 110 are labeled "viewers" and view the shared screen data. Synchronization of the shared screen data among the viewers and presenter occurs using the reliable multicast protocol.

During the meeting it may be desirous to allow another one of the participants to become the presenter and take control of the meeting. One way to facilitate this is to add the participant ID of the new presenter to an access control list that is defined by a versioned group called PANELISTS. In order to ensure that each of the communications servers 150 is aware of the new presenter, a composed view of the group of panelists is generated using the above-described principles and propagated to the other communications servers 150 of the distributed computing environment 100. In addition, another access control list defines specific operations that are allowed by the group of panelists. For example, the ability to annotate the shared screen data. Prior to allowing annotation of the shared screen data, either the participant software 212 or server software 312 evaluates the transitive closure of the panelists group to determine if the participant 110 requesting the ability to annotate the shared screen data is present in the group of panelists. If the participant 110 is a member of the group of panelists, annotation is allowed.

There are numerous on-line collaboration products that can operate in the distributed computing environment 100. Exemplary products include, but are not limited to GOTOMEETING and GOTOWEBINAR offered by Citrix Online, LLC of Santa Barbara Calif. Certain aspects and features described below can be embodied in such a product. Other products include WEBEX EMX, WEBEX ENTERPRISE EDITION, WEBEX EVENT CENTER, WEBEX GLOBALWATCH, WEBEX MEETING CENTER, WEBEX MEETMENOW, WEBEX PRESENTATION STUDIO, WEBEX SALES CENTER, WEBEX TRAINING CENTER, WEBEX WEBOFFICE, AND WEBEX WORKSPACE offered by WebEx Communications, Inc. of Santa Clara Calif. Also included is LIVEMEETING offered by Microsoft Corporation of Redmond Wash.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

Although the present invention has been described with reference to specific details, it is not intended that such details should be regarded as limitations upon the scope of the invention, except as and to the extent that they are included in the accompanying claims.

What is claimed is:

1. A method of generating a composed view of a state of each of a plurality of items in a distributed computing system having a plurality of computing devices, the method comprising:

(a) receiving a first plurality of objects having a same number of fields, each of the first plurality of objects being received from a different one of the plurality of computing devices in the distributed computing system and each of the first plurality of objects representing a state of a first item in the distributed computing system to which access is controlled, each field of the first plurality of objects storing information that defines the state of the first item;

(b) operating, by a first composer module, on the first plurality of objects to generate a first composed view object of the state of the first item, the first composed view object having the same number of fields as each of the first plurality of objects, the fields of the first composed view object storing a combination of information selected from the fields of the first plurality of objects, the first composer module selected for use from amongst a first plurality of composer modules that are each configured to operate differently on the first plurality of objects and to thereby generate different first composed view objects;

(c) receiving a second plurality of objects having a same number of fields, each of the second plurality of objects being received from a different one of the plurality of computing devices in the distributed computing system and each of the second plurality of objects representing a state of a second item in the distributed computing system to which access is controlled, each field of the second plurality of objects storing information that defines the state of the second item;

(d) operating, by a second composer module, on the second plurality of objects to generate a second composed view object of the state of the second item, the second composed view object having the same number of fields as each of the second plurality of objects, the fields of the second composed view object storing a combination of information selected from the fields of the second plurality of objects, the second composer module selected for use from amongst a second plurality of composer modules that are each configured to operate differently on the second plurality of objects and to thereby generate different second composed view objects; and (e) transmitting the first composed view object and the second composed view object using a reliable multicast protocol to at least some of the plurality of computing devices of the distributed computing system, the first composed view object and the second composed view object being used to achieve consistency and consensus about which computing devices within the distributed computing system can access which objects within the distributed computing system, the consistency and the consensus being achieved via one or more access control lists, the one or more access control lists being time-invariant and being defined in terms of one or more mutable groups, wherein the one or more mutable groups are not time-invariant.

2. The method of claim 1 wherein at least one of steps (a) and (c) comprises receiving a plurality of objects having the same number fields, each field storing information that defines the state of the object, the information stored in the field comprising one of the following data types: static state, monotonically increasing state, versioned cyclic state transition, a monotonic set, and non-cyclic state transitions.

3. The method of claim 2 wherein the data type of at least one of the plurality of fields is different from at least some of the others of the plurality of fields.

4. The method of claim 1 wherein operating by the first composer comprises operating on the first plurality of objects to generate a consensus composed view, the consensus composed view representing a state of the first item that is agreed upon by all the computing devices in the distributed computing system.

5. The method of claim 1 wherein operating by the first composer comprises operating on the first plurality of objects to generate a consistency composed view, the consistency composed view representing a state of the first item that is the same as the state of the first item represented in a composed view object generated by at least one other computing device in the distributed computing system.

6. The method of claim 1 wherein operating by one of the first composer and the second composer comprises performing an intersection operation on at least one of the plurality of fields of the plurality of objects.

7. The method of claim 1 wherein operating by one of the first composer and the second composer comprises performing a union operation on at least one of the plurality of fields of the plurality of objects.

8. The method of claim 1 wherein operating by one of the first composer and the second composer comprises performing a maximum value determination on at least one of the plurality of fields of the plurality of objects.

9. The method of claim 1 wherein operating by one of the first composer and the second composer comprises performing a minimum value determination on at least one of the plurality of fields of the plurality of objects.

10. The method of claim 1 wherein operating by the first composer comprises performing a first operation on at least one of the plurality of fields of the first plurality of objects and performing a second operation, different from the first operation, on another one of the plurality of fields of the first plurality of objects.

11. A system for generating a composed view of the state of each of a plurality of items in a distributed computing system having a plurality of computing devices, the system comprising:
- a receiver, in communication with a network using a reliable multi-cast protocol, receiving i) a first plurality of objects having a same number of fields, each of the first plurality of objects being received from a different one of the plurality of computing devices in the distributed computing system and each of the first plurality of objects representing a state of a first item in the distributed computing system to which access is controlled, each field of the first plurality of objects storing information that defines the state of the first item, and ii) a second plurality of objects having a same number of fields, each of the second plurality of objects being received from a different one of the plurality of computing devices in the distributed computing system and each of the second plurality of objects representing a state of a second item in the distributed computing system to which access is controlled, each field of the second plurality of objects storing information that defines the state of the second item;
- a first composer in communication with the receiver and selected for use from amongst a first plurality of composers, the first composer operating on the first plurality of objects to generate a first composed view object of the state of the first item, the first composed view object having the same number of fields as each of the first plurality of objects, the fields of the first composed view object storing a combination of information selected from the fields of the first plurality of objects, the first plurality of composers each being configured to operate differently on the first plurality of objects and to thereby generate different first composed view objects;
- a second composer in communication with the receiver and selected for use from amongst a second plurality of composers, the second composer operating on the second plurality of objects to generate a second composed view object of the state of the second item, the second composed view object having the same number of fields as each of the second plurality of objects, the fields of the second composed view object storing a combination of information selected from the fields of the second plurality of objects, the second plurality of composers each being configured to operate differently on the second plurality of objects and to thereby generate different second composed view objects; and
- a transmitter in communication with the first and second composers and the network, the transmitter transmitting, using the reliable multi-cast protocol, the first composed view object and the second composed view object to at least some of the plurality of computing devices of the distributed computing system, the first composed view object and the second composed view object being used to achieve consistency and consensus about which computing devices within the distributed computing system can access which objects within the distributed computing system, the consistency and the consensus being achieved via one or more access control lists, the one or more access control lists being time-invariant and being defined in terms of one or more mutable groups, wherein the one or more mutable groups are not time-invariant.

12. The system of claim 11 wherein the information stored in the fields comprises one of the following data types: static state, monotonically increasing state, versioned cyclic state transition, a monotonic set, and non-cyclic state transitions.

13. The system of claim 12 wherein the data type of at least one of the plurality of fields is different from at least some of the others of the plurality of fields.

14. The system of claim 11 wherein the first composer operates on the first plurality of objects and generates a consensus composed view, the consensus composed view representing a state of the first item that is agreed upon by all the computing devices in the distributed computing system.

15. The system of claim 11 wherein the first composer operates on the first plurality of objects and generates a consistency composed view, the consistency composed view representing a state of the first item that is the same as the state of the first item represented in a composed view object generated by at least one other computing device in the distributed computing system.

16. The system of claim 11 wherein one of the first composer and the second composer performs an intersection operation on at least one of the plurality of fields of the plurality of objects.

17. The system of claim 11 wherein one of the first composer and the second composer performs a union operation on at least one of the plurality of fields of the plurality of objects.

* * * * *